United States Patent [19]

Mizuno et al.

[11] 4,284,550

[45] Aug. 18, 1981

[54] FLAME RETARDING RESIN COMPOSITION

[75] Inventors: Shioji Mizuno, Osaka; Norio Enokimoto, Izumi; Kazuyoshi Oji, Takaishi, all of Japan

[73] Assignee: Dainippon Ink and Chemicals Inc., Tokyo, Japan

[21] Appl. No.: 184,159

[22] Filed: Sep. 4, 1980

Related U.S. Application Data

[63] Continuation of Ser. No. 52,448, Jun. 26, 1979, abandoned.

[30] Foreign Application Priority Data

Jun. 30, 1978 [JP] Japan ................................. 53-78529

[51] Int. Cl.$^3$ ........................... C08K 7/14; C08K 3/30
[52] U.S. Cl. ........................... 260/40 R; 260/45.75 B; 525/166; 525/175
[58] Field of Search ...... 260/45.7 RL, 40 R, 45.75 B; 525/166, 175

[56] References Cited

U.S. PATENT DOCUMENTS

| 3,764,576 | 10/1973 | Russo | 260/40 R |
|---|---|---|---|
| 3,814,725 | 6/1974 | Zimmerman et al. | 260/40 R |
| 3,855,277 | 12/1974 | Fox | 260/40 R |
| 4,070,332 | 1/1978 | Morikawa et al. | 260/40 R |
| 4,105,624 | 8/1978 | Boehlke et al. | 260/40 R |

FOREIGN PATENT DOCUMENTS 53-6016  3/1978  Japan .

Primary Examiner—V. P. Hoke
Attorney, Agent, or Firm—Sherman & Shalloway

[57] ABSTRACT

A flame-retarding resin composition comprising (1) polybutylene terephthalate, (2) an organohalogen compound as a flame-retarding agent, (3) a flame-retarding supplementary agent, (4) calcium sulfate, and (5) an inorganic fibrous reinforcing agent, and optionally (6) at least one polymer selected from a saponified polyvinyl acetate having a saponification degree of greater than 50 mole %, an ethylene/vinyl acetate copolymer, and a saponified ethylene/vinyl acetate copolymer.

16 Claims, No Drawings

FLAME RETARDING RESIN COMPOSITION

This is a continuation of application Ser. No. 052,448, filed June 26, 1979, now abandoned.

This invention relates to a polybutylene terephthalate resin (to be referred to as PBT) composition having strikingly reduced flammability.

Flame-retarding resin compositions having glass fibers, flame-retarding agents and flame-retarding supplementary agents incorporated into PBT have been used as molding materials having excellent mechanical properties and excellent flame-retarding properties. Such flame-retarding resin compositions achieve improvement in flame-retarding properties, namely, shortening of the so-called afterflaming time (burning time) which is the time taken for flame to become extinct after the source of the flame has been removed upon setting of fire. The flame-retarding resin compositions, however, do not show a sufficiently satisfactory decrease in the afterglow-retaining time, namely, the time taken for the afterglow of remaining fire to disappear after extinction of the flame, that is set forth in the Subject 94 of Underwriters' Laboratories Standards (UL 94) of the United States that have become the worldwide standards in recent years.

The object of the present invention is to provide a flame-retardant resin composition obviating the above-mentioned defects.

We have found that the afterglow-retaining time can be shortened sufficiently by adding calcium sulfate to a composition comprising PBT, a flame retardant, a flame retardant supplementary agent, and an inorganic fibrous reinforcing agent, and that not only can the afterglow-retaining time be shortened but the dripping of melt can also be prevented by further adding to the mixture of calcium sulfate and the composition a polymer selected from the group consisting of saponified polyvinyl acetate, an ethylene/vinyl acetate copolymer and a saponified ethylene/vinyl acetate copolymer.

Thus, according to the present invention, there is provided a flame-retarding resin composition comprising (1) PBT, (2) an organohalogen compound as a flame retarding agent, (3) a flame retarding supplementary agent, (4) calcium sulfate and (5) an inorganic fibrous reinforcing agent, and optionally, (6) at least one polymer selected from a saponified polyvinyl acetate having a saponification degree of greater than 50 mole%, an ethylene/vinyl acetate copolymer, and a saponified ethylene/vinyl acetate copolymer.

An effect of the composition of the present invention is to shorten the afterglow-retaining time greatly, without lengthening the afterflaming time, because of incorporation of calcium sulfate, thereby to provide more safety against re-firing. This effect cannot be obtained if an alkaline earth metal compound other than calcium sulfate, such as calcium carbonate, calcium hydroxide or calcium oxide, or a filler such as asbestos or talc is added instead of calcium sulfate; rather, the addition of such a substance other than calcium sulfate could make the afterglow-retaining time longer in some cases.

Another effect of the composition of the present invention is that because calcium sulfate is incorporated, a high flexural modulus is imparted to a flame retardant-containing, inorganic fiber-reinforced PBT composition inferior in stiffness (i.e. flexural modulus) to a flame retardant-free, inorganic fiber-reinforced PBT composition.

A further effect of the composition of the present invention is that the dripping of melt which is one of the causes of re-firing can be prevented because the composition contains at least one polymer selected from a saponified polyvinyl acetate having a saponification degree of greater than 50 mole%, an ethylene/vinyl acetate copolymer and a saponified ethylene/vinyl acetate copolymer. In detail, a flame-retarding PBT composition containing no calcium sulfate usually has a tendency that if melt does not drip at the time of combustion, afterglow easily occurs after extinction of the flame and the afterglow-retaining time becomes long. When said polymer is jointly used in addition to calcium sulfate in accordance with the present invention, there can be obtained a composition which is shorter in the afterglow-retaining time, which is free from the dripping of melt and which is even safer against re-firing.

Calcium sulfate usable in the present invention may be a wide variety of calcium sulfates having any crystal structure, containing or not containing water of crystallization, and having any shape (e.g. spherical or fibrous shape). Examples of such calcium sulfates include gypsum formed as a by-product in the production of phosphoric acid; dihydrate of gypsum formed by desulfurization of fumes; calcined gypsum; calcium sulfate hemihydrate obtained by heat-treating calcium sulfate dihydrate under pressure in the presence of a crystallizing agent; anhydrous calcium sulfate obtained by dehydrating naturally occurring anhydrous calcium sulfate hemihydrate with heating; and anhydrous calcium sulfate fibers of needle-like crystals. The amount of the calcium sulfate is .5 to 100 parts by weight (to be abbreviated to parts), preferably 10 to 70 parts, as anhydride, per 100 parts of PBT. If the amount of the calcium sulfate exceeds 100 parts, the resulting composition will have reduced mechanical strengths, particularly, reduced toughness. If its amount is less than 5 parts, satisfactory shortening of the afterglow-retaining time will not be obtained.

PBT of the present invention usually has an intrinsic viscosity $[\eta]$, measured at 30° C. in a mixed solvent of phenol and tetrachloroethane in a weight ratio of 6:4, of 0.5 to 1.5 dl/g. That PBT is generally synthesized by the polycondensation of terephthalic acid or its alkyl ester with 1,4-butanediol, but may be that synthetic product in which 40 mole% or lower of the acid component or the alcohol component is replaced with another acid or alcohol, respectively. Examples of such a replacing acid component include aliphatic dicarboxylic acids such as adipic acid or sebacic acid, alicyclic dicarboxylic acids such as cyclohexanedicarboxylic acid, and aromatic dicarboxylic acids such as isophthalic acid. Examples of such substituting alcohol component include aliphatic glycols such as ethylene glycol, 1,2-butanediol, 1,3-butanediol or 1,6-hexanediol, alicyclic glycols such as 1,4-cyclohexanedimethanol, and aromatic glycols such as 4,4'-hydroxyethyl-oxyphenylpropane. In the composition of the present invention, it is also possible to replace 40 weight% or less of PBT by another thermoplastic resin such as polyolefin, polystyrene, ABS, acrylic resin, vinyl acetate resin, polyacetal, polycarbonate, polyurethane, saturated polyesters such as polyethylene terephthalate, polysulfone, polyphenylene sulfide or polyamide. It is further possible to use as PBT of the present invention a high-molecular polyester polyurethane obtained by increasing the molecular weight of a low-molecular PBT $[\eta]$:

0.15 to 0.5 dl/g) having terminal hydroxyl groups with the use of a polyfunctional isocyanate.

The flame retarding agent used in the present invention, i.e., organohalogen compounds, may specifically be tetrabromoethane, 1,2-dibromo-1,1,2,2-tetrachloroethane, 1,2-dibromo-5-chloropropane, 1,2,3-tribromopropane, 1,2,3,4-tetrabromobenzene, chlorinated paraffin, hexabromobenzene, pentabromotoluene, pentabromophenol, perchlorocyclodecane, chlorinated diphenyl, chlorinated, terphenyl, brominated diphenyl, brominated terphenyl, chlorinated diphenyl ether, brominated diphenyl ether, brominated naphthalene, 3,4,5,6-tetrachlorophthalic anhydride, 3,4,5,6-tetrabromophthalic anhydride, tetrabromobisphenol A, the reaction product of tetrabromobisphenol A with epichlorohydrin, the ethylene oxide adduct of tetrabromobisphenol A, the polymer obtained from the ethylene oxide adduct of tetrabromobisphenol A and dicarboxylic acid, the reaction product of tetrabromobisphenol A with dibromoethane, polycarbonate obtained from tetrabromobisphenol A and phosgene, tribromophenol, the polymer of tribromophenol, tetrabromophthalimide, tris-(2,3-dibromopropyl) isocyanurate, trimethyl phosphite, dimethyl phosphonate, diamyl phosphonate, tributyl phosphonate, 2-ethylhexyl diphenyl phosphonate, tris-(2-chloroethyl) phosphate, tris-(2-bromoethyl) phosphate, tris-(2,3-dichloro) phosphate, tris-(2,3-dibromo) phosphate, and tris-(2,4,6-tribromophenyl) phosphate. Of these organohalogen compounds, preferred are those containing two or more chlorine and/or bromine atoms in one molecule, and more preferable are aromatic halogen compounds. Particularly suitable halogen compounds are disclosed in U.S. Pat. Nos. 3,873,491, 3,855,277 and 4,105,622.

The amount of the organohalogen compound used is 3 to 50 parts, preferably 10 to 40 parts, per 100 parts of PBT. If its amount is less than 3 parts, the flame-retarding properties are not sufficient, whereas if the amount is in excess of 50 parts, the physical properties of the polyester are remarkably deteriorated. If the amount of the organohalogen compound used is expressed as the amount of halogen contained in the organohalogen compound, it is suitably 2 to 20% by weight based on PBT.

The flame-retarding supplementary agent in the present invention is preferably inorganic compounds, suitable examples of which are oxides, sulfides, halides, borates, metaborates, carbonates and hydroxides of metals. Examples of the metals include antimony, bismuth, arsenic, tin, zirconium, barium, lead and aluminum. Of these metals, antimony, bismuth and arsenic (metals of the Group Vb) are preferred, and antimony is most preferable. Specific examples of the flame-retarding supplementary agent are antimony trioxide, antimony pentaoxide, antimony trisulfide, antimony trichloride, antimony pentachloride, antimony tribromide, antimony pentabromide, sodium pyroantimonate, barium metaborate, tin oxide, tin borate, tin chloride, zinc borate, aluminum hydroxide, zirconium oxide and molybdenum oxide. The amount of the flame-retarding supplementary agent used is 0.1 to 20 parts, preferably 1 to 15 parts, per 100 parts of PBT. If its amount is less than 0.1 part, the flame-retarding properties are poor, while if the amount exceeds 20 parts, the strength of the composition decreases.

Examples of the inorganic fibrous reinforcing agent used in the present invention include glass fiber, carbon fiber, metal fiber and asbestos fiber. The glass fiber is particularly preferred because the mechanical strength of the composition increases strikingly in proportion to the amount of the glass fiber incorporated, and also, the glass fiber contributes to increase the heat resistance. The glass fiber is incorporated in the form of a roving glass, a chopped strand glass, or a milled glass. They should preferably have been treated with a coupling agent of the vinyl silane, amino silane or epoxy silane type. The amount of the glass fiber used is 5 to 120 parts, preferably 10 to 100 parts, per 100 parts of PBT. If its amount is less than 5 parts, the composition has low mechanical strength; if the amount exceeds 120 parts, the moldability of the composition becomes poor. The glass fiber in a molded article formed from the composition of the present invention should desirably have a diameter of 0.005 to 0.020 mm and a length of 0.01 to 10 mm, more preferably 0.05 to 1 mm.

Among the aforesaid polymers optionally used to prevent the dripping of melt in the present invention (namely, the polymers used as drip-preventing agents), the saponified polyvinyl acetate having a saponification degree of greater than 50 mole% should preferably have a degree of polymerization of 300 to 3,000. Examples of such saponified polyvinyl acetate are GOHSENOL NL-05 (a product of the Nippon Synthetic Chemical Industry Co., Ltd., P=500, degree of saponification: greater than 98.5 mole%), GOHSENOL NM-14 (a product of the Nippon Synthetic Chemical Industry Co., Ltd., P=1400, degree of saponification: greater than 99 mole%), GOHSENOL NH-20 (a product of the Nippon Synthetic Chemical Industry Co., Ltd., P=2000, degree of saponification: greater than 99 mole%), GOHSENOL GL-08 (a product of the Nippon Synthetic Chemical Industry Co., Ltd., P=1100, degree of saponification: greater than 85 mole%), and GOHSENOL GH-17 (a product of the Nippon Synthetic Chemical Industry Co., Ltd., P=2100, degree of saponification; greater than 85 mole%).

The preferred ethylene/vinyl acetate copolymer usually has a vinyl acetate content or greater than 50% by weight and a Mooney viscosity of 10 to 80, and that having a vinyl acetate content of 60 to 90% by weight and a Mooney viscosity of 20 to 70 is particularly recommendable. Such ethylene/vinyl acetate can be prepared by a known polymerization method, and that obtained by an emulsion polymerization method is suitable. Specific examples include EVATHLENE 310 (a product of Dainippon Ink And Chemicals, Inc., vinyl acetate content of 70% by weight, Mooney viscosity of 55), EVATHLENE 420 (a product of Dainippon Ink And Chemicals, Inc., vinyl acetate content of 60% by weight, Mooney viscosity of 35), and the like.

Suitable examples of the saponified ethylene/vinyl acetate copolymer are saponified copolymers having a vinyl acetate content of greater than 50% by weight. Their saponification degree may be in a given range, but the higher their saponification degree is, the better their compatibility with the polyester becomes. Their specific examples include GL resin (a product of the Nippon Synthetic Chemical Industry Co., Ltd.).

The drip-preventing agents having varying molecular weights can be used in the present invention, though the one having a higher molecular weight exhibits increased drip-preventing effect. That having a higher molecular weight, however, has a tendency to be poor in compatibility with PBT. The amount of the drip-preventing agent used in the present invention is 0 to 30 parts, preferably 1 to 30 parts, more preferably 2 to 20 parts, per 100 parts of PBT. If its amount is less than 1 part, it does not exhibit drip-preventing effect. If the amounts is more than 30 parts, its compatibility with PBT worsens. Among the drip-preventing agents of the present invention, the ethylene/vinyl acetate copolymer has the best drip-preventing effect, but if its amount added increases, its compatibility with PBT tends to lower. The saponified polyvinyl acetate or the saponified ethylene/vinyl acetate copolymer, on the other hand, is inferior in drip-preventing effect to the ethylene/vinyl acetate copolymer, but has good compatibility with PBT. Therefore, the joint use of the ethylene/vinyl acetate copolymer and the saponified polyvinyl acetate, or of the ethylene/vinyl acetate and its saponification product, for example, would provide excellent compatibility with PBT and remarkable drip-preventing effect.

The composition of the present invention can be prepared by various methods, but it is effective to prepare it by an extruder. The mixing by the extruder is effected, suitably, under the conditions of a heating temperature of 180° to 300° C. and a mixing time of 0.2 to 30 minutes. The extruder may be a single-screw extruder or a twin-screw extruder, and a vented extruder works particularly effectively when hydrous calcium sulfate is used.

The composition of the present invention may further contain other additives such as nucleating agents, pigments, dyes, plasticizers, parting agents, lubricants, heat stabilizers, anti-oxidizing agents, ultraviolet absorbing agents, blowing agents and coupling agents.

The composition of the present invention is useful for molding purposes. Molded articles formed from the composition of the present invention include sheets, tubes, coil bobbins, connectors, switches, and cases. The molding method is usually injection molding.

The present invention is illustrated concretely with reference to the non-limitative Examples below. The parts in the Examples are by weight.

The flame-retarding properties of each of the Examples are measured and evaluated in accordance with the Subject 94 of Underwriters' Laboratories Standards (UL 94) of the United States. Sheets of length of 5 inches, width of ½ inch, and thickness of 1/16 inch or 1/32 inch formed by the injection molding are used as test specimens. A blue flame of a height of ¾ inch without yellow tip is used as a source of flame, which is obtained by burning a gas of 1000 BTU composed principally of a methane gas using a burner having an inner diameter of ⅜ inch and a length of 4 inches. A first test is performed by so holding the test piece that its longer side is in a vertical direction, exposing the test piece to the flame for 10 seconds such that the distance between the lower end of the test piece and the upper end of the flame is ⅜ inch, and then removing the source of flame to record the flame-sustaining (flaming) time. Immediately after the flame has extinguished, a second test is performed by exposing again the test specimen to the flame for 10 seconds in the same manner as above, and removing the source of flame to record the flame-sustaining time. After the second flaming, namely, after the flame has extinguished, the time during which the test piece emits a red afterglow (afterglow-retaining time) is recorded. It is also observed whether or not the melted portion of the test piece drips during the contact of the test piece with the source of flame, or during the flaming time after the removal of the source of flame, or during the afterglow-retaining time.

The mechanical properties in each of the Examples are measured in accordance with the ASTM standards.

EXAMPLE 1

100 Parts of PBT ($[\eta]=0.8$) being the polycondensation product of dimethyl terephthalate with 1,4-butanediol obtained by an ordinary method, 24 parts of an epoxy resin as a flame retarding agent having an epoxy equivalent of 1654 and obtained by the reaction of tetrabromobisphenol A with epichlorohydrin, 7 parts of antimony trioxide, and 60 parts of calcium sulfate hemihydrate (calcined gypsum produced by Mutsu Chemical Co., Ltd.) were mixed by means of a tumbling mixer, and then, 48 parts of an aminosilane-treated, 3 mm-long, chopped strand glass (a bundle of 800 glass fibers with a diameter of $13\mu$) was added, followed by homogeneously mixing them. Then, the mixture was fed into a 65 mm vented extruder with a full-flighted screw having a cylinder heated at 250° C., where the feed was plasticized, homogeneously kneaded, and extruded, followed by cooling the extrudate to obtain pellets. The pellets were formed into test pieces by an injection molding machine, and the flaming properties and mechanical properties of the test pieces were measured.

As a result, the test piece with a thickness of 1/16 inch had a flaming time of 0 and 2 seconds in the first and second tests, respectively, and an afterglow-retaining time of 1 second, without any dripping of melt being observed. With the test piece having a thickness of 1/32 inch, on the other hand, the flaming time in the first test was 0 second, and melt dripped during the contact with flame in the second test.

The test pieces had a tensile strength (to be abbreviated to TS) of 900 $Kg/cm^2$, a tensile elongation (to be abbreviated to TE) of 1.3%, a flexural strength (abbreviated to FS) of 1,300 $kg/cm^2$ and a flexural modulus (abbreviated to FM) of $8\times 10^4$ $kg/cm^2$.

EXAMPLE 2

In Example 1, 10 parts of an ethylene/vinyl acetate copolymer (EVATHLENE ® 310P, a product of Dainippon Ink And Chemicals, Inc.) and 5 parts of a saponified ethylene/vinyl acetate copolymer (GL resin, a product of the Nippon Synthetic Chemical Industry Co., Ltd.) were further added as drip-preventing agents to obtain pellets similarly. A test piece having a thickness of 1/32 inch produced from the pellets was tested for flaming properties. The flaming time of the test piece in the first and the second tests was 0 second and 1 second, respectively, while the afterglow-retaining time was 0 second. No dripping of melt was observed in the tests. The test piece had TS of 880 $kg/cm^2$, TE of 1.3%, FS of 1,280 $kg/cm^2$ and FM of $8\times 10^4$ $kg/cm^2$.

COMPARATIVE EXAMPLE 1

The procedure of Example 1 was repeated without the addition of the calcium sulfate hemihydrate. The resulting 1/16 inch-thick test piece was tested for flaming properties. In the first and second tests the flaming time was 5 and 11 seconds, respectively, the afterglow-retaining time was 15 seconds, and no drips of melt observed. TS was 850 $kg/cm^2$, TE, 1.6%, FS, 1,200 $kg/cm^2$, and FM, $6\times 10^4$ $kg/cm^2$.

COMPARATIVE EXAMPLE 2

The procedure of Example 2 was repeated without the addition of the calcium sulfate hemihydrate. The resulting 1/32 inch-thick test piece was tested for flaming properties. In the first and second tests the flaming time was 6 and 12 seconds, respectively, and the afterglow-retaining time was 20 seconds, with no drips of melt observed. The test piece had TS of 830 kg/cm$^2$, TE of 1.6%, FS of 1,170 kg/cm$^2$ and FM of 6×10$^4$ kg/cm$^2$.

EXAMPLES 3 to 5

100 parts of PBT with [η] of 0.8, 20 parts of decabromobiphenyl ether, 2 parts of antimony trioxide, 5 parts of zinc borate, and 48 parts of an aminosilane-treated chopped strand glass with a length of 3 mm were formulated into a base blend. To the base blend was added anhydrous calcium sulfate (a product of Onoda Cement Co., Ltd.) in an amount varied in the range of 60 to 10 parts as shown in Table 1. Then, the resulting composition was subjected to the aforementioned tests. The results are shown in Table 1.

COMPARATIVE EXAMPLE 3

Example 4 was repeated without the addition of the anhydrous calcium sulfate. The results of the tests are shown in Table 1.

COMPARATIVE EXAMPLE 4

Example 4 was repeated with the use of calcium carbonate instead of the anhydrous calcium sulfate. The results of the tests are listed in Table 1.

COMPARATIVE EXAMPLE 5

Example 4 was repeated using calcium silicate (mineral name: Wollastonite) instead of the anhydrous calcium sulfate. The test results are illustrated in Table 1.

thetic Chemical Industry Co., Ltd.) were blended and formed into pellets in the same manner as in Example 1.

A 1/32 inch-thick test piece molded from the pellets was tested for burning characteristics. The flaming time was 0 and 1 second in the first and second tests, respectively, the afterglow-retaining time was 1 second, and no dripping of melt was observed. TS was 800 kg/cm$^2$, TE was 1.4%, FS was 1,200 kg/cm$^2$ and FM was 8×10$^4$ kg/cm$^2$.

EXAMPLE 7

100 parts of PBT with [η] of 1.0, 30 parts of hexabromobenzene, 10 parts of antimony trioxide, 20 parts of the calcium sulfate of Example 1, 10 parts of glass fiber, and 10 parts of an ethylene/vinyl acetate copolymer (EVANTHELENE ® 310P) were blended and formed into pellets in the same way as in Example 1.

A 1/32 inch-thick test piece prepared from the pellets was tested for burning characteristics. The flaming time in the first and second tests was 0 and 1 second, respectively, and the afterglow-retaining time was 2 seconds, with no dripping of melt appreciated. The test piece had TS of 700 kg/cm$^2$, TE of 2.0%, FS of 1,000 kg/cm$^2$ and FM of 7×10$^4$ kg/cm$^2$.

What is claimed is:

1. A flame-retarding resin composition comprising (1) polybutylene terephthalate, (2) an organohalogen compound as a flame-retarding agent, (3) a flame-retarding supplementary agent, (4) calcium sulfate, and (5) glass fiber reinforcing agent, and (6) at least one polymer selected from a saponified polyvinyl acetate having a saponification degree of greater than 50 mole%, an ethylene/vinyl acetate copolymer, and a saponified ethylene/vinyl acetate copolymer.

TABLE 1

|  | Inorganic filler |  | Thickness of test piece (inch) | Flaming time in 1st test (sec) | Flaming time in 2nd test (sec) | Afterglow retaining time (sec) | Dripping of melt | TS (kg/cm$^2$) | TE (%) | FS (kg/cm$^2$) | FM (kg/cm$^2$) |
|---|---|---|---|---|---|---|---|---|---|---|---|
| Ex. 3 |  | 60 parts | 1/16 | 0 | 1 | 0 | No | 1100 | 1.5 | 1500 | 1 × 10$^5$ |
| Ex. 4 |  | 30 | 1/16 | 1 | 2 | 0 | " | 1050 | 1.5 | 1450 | 9 × 10$^4$ |
| Ex. 5 | Anhydrous calcium sulfate | 10 | 1/16 | 3 | 5 | 3 | " | 950 | 1.5 | 1300 | 7 × 10$^4$ |
| Comp. Ex. 3 |  | 0 | 1/16 | 5 | 9 | 32 | " | 820 | 1.7 | 1150 | 5.5 × 10$^4$ |
| Comp. Ex. 4 | Calcium carbonate | 30 | 1/16 | 1 | 2 | 50 | " | 950 | 1.3 | 1350 | 8 × 10$^4$ |
| Comp. Ex. 5 | Calcium silicate | 30 | 1/16 | 2 | 2 | 40 | " | 1100 | 1.7 | 1500 | 9 × 10$^4$ |

EXAMPLE 6

100 parts of PBT urethane obtained by reacting 100 parts of a low-molecular PBT having OHV of 17.5 and AN of 0.45 and terminated mostly with hydroxyl groups with 5.6 parts of dimethylmethane-4,4'-diisocyanate at 250° C. for 5 minutes, 30 parts of an oligomer having a melting point of 200° to 210° C., an average molecular weight of 4,000 and an average degree of polymerization of 6.8 and being obtained by the reaction of tetrabromobisphenol A with dibromoethyleneoxide, 10 parts of antimony trioxide, 20 parts of the calcium sulfate hemihydrate of Example 1, 60 parts of an epoxysilane-treated chopped strand glass with a length of 6 mm, and 10 parts of saponified polyvinyl alcohol (GOHSENOL ® GH-17, degree of saponification of greater than 85%, produced by the Nippon Syn- 2. A composition according to claim 1, comprising 3 to 50 parts by weight, per 100 parts by weight of the polybutylene terephthalate (1), of the organohalogen compound (2) as a flame-retarding agent.

3. A composition according to claim 1, comprising 0.1 to 20 parts by weight, per 100 parts by weight of the polybutylene terephthalate (1), of the flame-retarding supplementary agent (3).

4. A composition according to claim 1, comprising 5 to 100 parts by weight, per 100 parts by weight of the polybutylene terephthalate (1), of the calcium sulfate.

5. A composition according to claim 1, comprising 5 to 120 parts by weight, per 100 parts by weight of the polybutylene terephthalate (1), of the glass fiber reinforcing agent (5).

6. A composition according to claim 1, comprising 100 parts by weight of the polybutylene terephthalate (1), 3 to 50 parts by weight of the organohalogen compound (2) as a flame-retarding agent, 0.1 to 20 parts by weight of the flame-retarding supplementary agent (3), 5 to 100 parts by weight of the calcium sulfate, (4) 5 to 120 parts by weight of the glass fiber reinforcing agent (5), and 1.0 to 30 parts by weight of at least one polymer (6) selected from the saponified polyvinyl acetate having a saponification degree of greater than 50 mole%, the ethylene/vinyl acetate copolymer, and the saponified ethylene/vinyl acetate copolymer.

7. A composition according to claim 1, wherein the organohalogen compound (2) as a flame-retarding agent contains two or more chlorine and/or bromine atoms in one molecule.

8. A composition according to claim 1, wherein the flame-retarding supplementary agent (3) is an oxide, sulfide, halide, borate, metaborate, carbonate or hydroxide or a metal.

9. A process for preparing a flame-retarding resin composition, which comprises heating and kneading (1) polybutylene terephthalate, (2) an organohalogen compound as a flame-retarding agent, (3) a flame-retarding supplementary agent, (4) calcium sulfate, and (5) glass fiber reinforcing agent, and (6) at least one polymer selected from a saponified polyvinyl acetate having a saponification degree of greater than 50 mole%, an ethylene/vinyl acetate copolymer, and a saponified ethylene/vinyl acetate copolymer.

10. A process according to claim 9, wherein the heating and kneading is performed using an extruder at a temperature of 180° to 300° C. for a period of 0.2 to 30 minutes.

11. Articles obtained using a composition according to claim 1.

12. A composition according to claim 1 comprising 100 parts by weight of the polybutylene terephthalate (1); 10 to 40 parts by weight of the organohalogen compound (2) as a flame-retarding agent; 1 to 15 parts by weight of the flame-retarding supplementary agent (3); 10 to 70 parts by weight of the calcium sulfate (4); 10 to 100 parts by weight of the glass fiber reinforcing agent (5); and 1.0 to 30 parts by weight of at least one polymer (6).

13. A composition according to claim 12 which comprises 2 to 30 parts by weight of at least one polymer (6).

14. A composition according to claim 1 wherein the organohalogen compound as flame-retarding agent (2) is an aromatic halogen compound containing two or more halogen atoms selected from the group consisting of chlorine and bromine or mixtures thereof and the flame retarding supplementary agent (3) is antimony trioxide.

15. A process according to claim 14 wherein the aromatic halogen compound (2) is the reaction product of tetrabromobisphenol A with epichlorohydrin.

16. A composition according to claim 1 which comprises 100 parts by weight of the polybutylene terephthalate (1); about 24 parts by weight of the aromatic halogen compound (2); about 7 parts by weight of antimony trioxide (3); about 60 parts by weight of calcium sulfate (4); about 48 parts by weight of glass fiber reinforcing agent (5); and a mixture of about 10 parts by weight of ethylene/vinyl acetate copolymer and about 5 parts by weight of saponified ethylene/vinyl acetate copolymer.

* * * * *